US010006554B2

(12) United States Patent
Seo (10) Patent No.: US 10,006,554 B2
(45) Date of Patent: Jun. 26, 2018

(54) SPRING VENT OF TIRE VULCANIZING MOLD

(71) Applicant: MEGA INDUSTRY CO., LTD., Ansan-si (KR)

(72) Inventor: Seok Jun Seo, Ansan-si (KR)

(73) Assignee: MEGA INDUSTRY CO., LTD., Ansan-si (KR)

( * ) Notice: Subject to any disclaimer, the term of this patent is extended or adjusted under 35 U.S.C. 154(b) by 91 days.

(21) Appl. No.: 15/211,307

(22) Filed: Jul. 15, 2016

(65) Prior Publication Data

US 2017/0350520 A1 Dec. 7, 2017

(30) Foreign Application Priority Data

Jun. 2, 2016 (KR) .................. 10-2016-0068819

(51) Int. Cl.
*B29C 33/10* (2006.01)
*F16K 24/04* (2006.01)
*B29D 30/06* (2006.01)
*F16K 17/04* (2006.01)

(52) U.S. Cl.
CPC .............. *F16K 24/04* (2013.01); *B29C 33/10* (2013.01); *B29D 30/0606* (2013.01); *F16K 17/04* (2013.01); *B29D 2030/0617* (2013.01)

(58) Field of Classification Search
CPC . B29C 35/02; B29C 33/10; B29D 2030/0617; B29D 30/0606; F16K 24/04; F16K 17/04
See application file for complete search history.

(56) References Cited

U.S. PATENT DOCUMENTS

| 8,123,508 | B2 * | 2/2012 | Hajduch | B29C 33/10 249/141 |
| 8,801,996 | B2 * | 8/2014 | Penkkimaki | B29C 33/10 264/326 |
| 8,882,947 | B2 * | 11/2014 | Cazzanti et al. | B29C 33/10 156/110.1 |
| 2015/0336343 | A1 * | 11/2015 | Takahashi | B29D 30/0662 264/236 |
| 2017/0157871 | A1 * | 6/2017 | Ohara | B29D 30/0606 |

FOREIGN PATENT DOCUMENTS

KR 100956242 5/2010

\* cited by examiner

*Primary Examiner* — Kevin Lee
(74) *Attorney, Agent, or Firm* — Cantor Colburn LLP (57) ABSTRACT

A spring vent for a tire vulcanizing mold comprises: a sleeve having a flow path vertically passing therethrough; a head opening/closing an inlet at an upper end of the flow path; a rod comprising a bar-type body formed below the head and disposed along the flow path and a stopper formed below the body to be hung to an outside of an outlet at a lower end of the flow path; and a spring inserted into the body. The stopper of the rod is formed to have a spherical shape. An elastic hole having an open bottom is formed in the stopper.

5 Claims, 14 Drawing Sheets

SPRING VENT OF TIRE VULCANIZING MOLD

BACKGROUND OF THE INVENTION

Field of the Invention

The present invention relates to a spring vent of a tire vulcanizing mold for exhausting air between a tire and the vulcanizing mold during vulcanization, more particularly to a spring vent of a tire vulcanizing mold, in which, due to structural improvement of the spring vent, a rod is easily replaced at a sleeve in an assembled state of the spring vent and mold, thereby reducing maintenance costs and increasing work efficiency.

Description of the Related Art

Generally, a tire vulcanizing mold process includes inserting a green tire (raw tire) into a uniform mold, and applying heat and pressure inside and outside of the mold to perform a reaction between rubber and sulfur or other chemicals, thereby forming a tire.

During molding a tire, the spring vents for the tire vulcanizing mold are used to exhaust air between the green tire and the vulcanizing mold.

That is, a plurality of drill holes is formed at the vulcanizing mold and the spring vents are mounted in the drill holes. As a result, air is exhausted through the spring vents.

As a conventional art related to a spring vent for a tire vulcanizing mold, Korean Patent No. 10-0956242 (issued on Apr. 27, 2010, herein after referred as to "conventional art") entitled "A MINI VENT STRUCTURE FOR TIRE MOLD" is disclosed.

Hereinafter, a configuration of the conventional art will be described.

As illustrated in FIGS. 2 to 4, a casing having a vent hole passing through a central part thereof in a vertical direction, and a valve structure elastically supported by a spring in the vent hole to open/close the vent hole of the casing are provided.

The valve structure includes a head disposed at an upper part thereof and a shaft disposed at a central part thereof. A stopper is provided at a lower part of the valve structure to be integrated with the shaft. The stopper has a diameter greater than that of the shaft to prevent the valve structure from being separated from the casing.

A plurality of engagement parts is provided at an inner diameter surface of a lower part of the casing to engage with an upper end of the stopper. The engagement parts are spaced apart a constant distance from one another.

Hereinafter, an operation method of the conventional art will be described.

When pressure is applied in the vulcanizing mold, air in the vulcanizing mold and green tire flows into the vent hole through an inlet at an upper end of the vent hole of the casing, and then air moving along the vent hole is exhausted through a space between a lower end of the casing and the stopper of the valve structure (each space formed between the engagement parts of the casing) to the outside of the vulcanizing mold.

Sequentially, as pressure is continuously applied to the green tire in the mold, the green tire and the head of the valve structure are in contact with each other. As a result, the head goes down by the green tire to close the upper inlet of the vent hole of the casing.

However, according to the mini vent including the above-described components, for replacement of the valve structure, the engagement parts protruding from the inner diameter of the casing are damaged using a tool so that the stopper of the valve structure is capable of passing through the vent hole of the casing, and then the valve structure is lifted upwards to separate the valve structure from the casing.

However, when the engagement parts are damaged using the tool, the casing and valve structure are damaged and are not restored to the original shape thereof, such that the entire mini vent should be replaced.

Thus, it is inconvenient to replace the valve structure in the casing, and, as such, maintenance costs are increased and work efficiency is decreased.

RELATED ART DOCUMENT

Korean Patent No. 10-0956242

SUMMARY OF THE INVENTION

Therefore, the present invention has been made in view of the above problems, and it is an object of the present invention to provide a spring vent of a tire vulcanizing mold, in which due to structural improvement of the spring vent, a rod is easily replaced at a sleeve in an assembled state of the spring vent and mold, thereby reducing maintenance costs and increasing work efficiency.

In accordance with one aspect of the present invention, the above and other objects can be accomplished by the provision of a spring vent for a tire vulcanizing mold including a sleeve having a flow path vertically passing therethrough, a head opening/closing an inlet at an upper end of the flow path, a rod including a bar-type body formed below the head and disposed along the flow path and a stopper formed below the body to be hung to an outside of an outlet at a lower end of the flow path, and a spring inserted into the body.

The stopper of the rod is formed to have a spherical shape, an elastic hole having an open bottom is formed in the stopper, as plane surfaces are formed at opposite surfaces of the stopper, a first face short shaft and a second face are formed at the stopper, as a length of the second face of the stopper is greater than a diameter of the outlet, a length of the first face of the stopper is smaller than the diameter of the outlet, The stopper is elastically deformed when the stopper passes through the outlet of the flow path. After passing through the outlet, the stopper is restored to the original shape thereof. As a result, when replacing the rod, the stopper is elastically restored, and, as such, it is easy to replace the rod.

In accordance with another aspect of the present invention, the above and other objects can be accomplished by the provision of a method of manufacturing the rod including mounting a round bar having a constant diameter on a lathe, shaping an end of the round bar using a drill to form the elastic hole, shaping the round bar using a bite to form the stopper, body, head and plane surfaces, and cutting the head of the rod shaped with the stopper, body, and head from the round bar.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention are described in detail with reference to the accompanying drawings. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible embodiment of the invention. Therefore, it should be understood that various changes may be made and equivalents may be substituted for elements of the invention.

Figure 1:
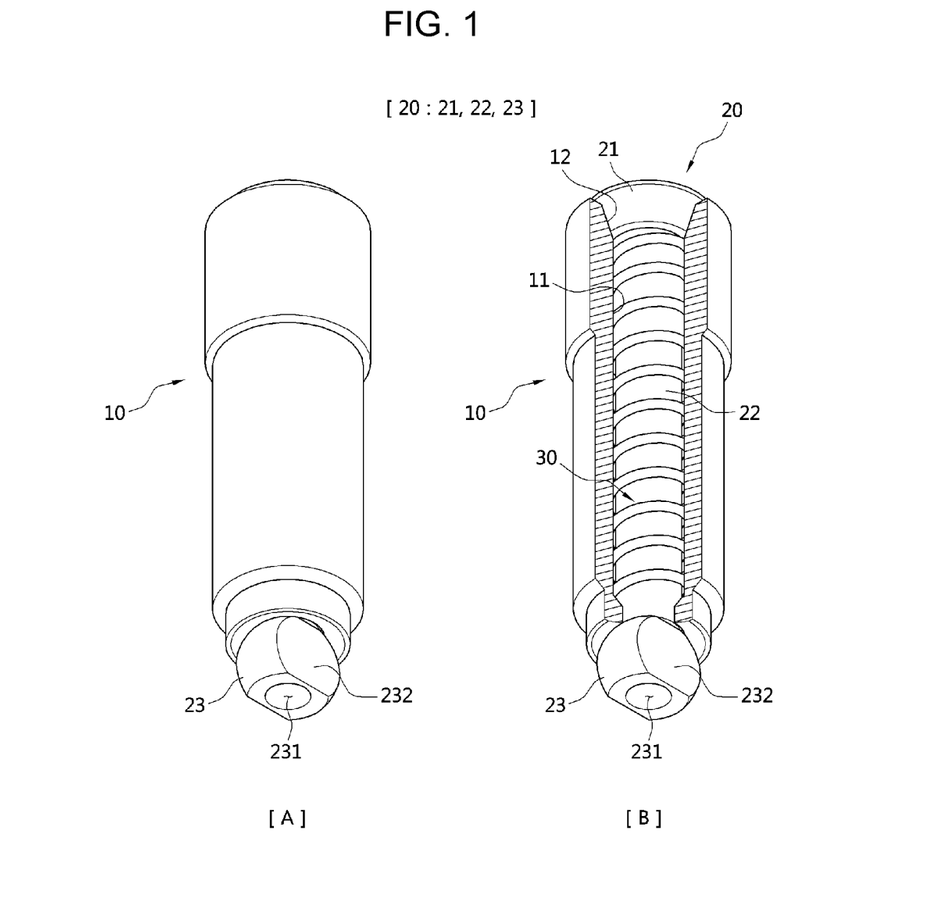
FIG. 1 is block diagrams of a spring vent for a tire vulcanizing mold according to an embodiment of the present invention.

In addition, a direction toward a head 1 is referred to as an upper direction and a direction toward a stopper 23 is referred to as a lower direction in accordance with FIG. 1.

According to the illustrated embodiment of the present invention, the spring vent for the tire vulcanizing mold mainly includes a sleeve 10, a rod 20 and a spring 30. Hereinafter, the components of the spring vent will be described.

Figure 2:
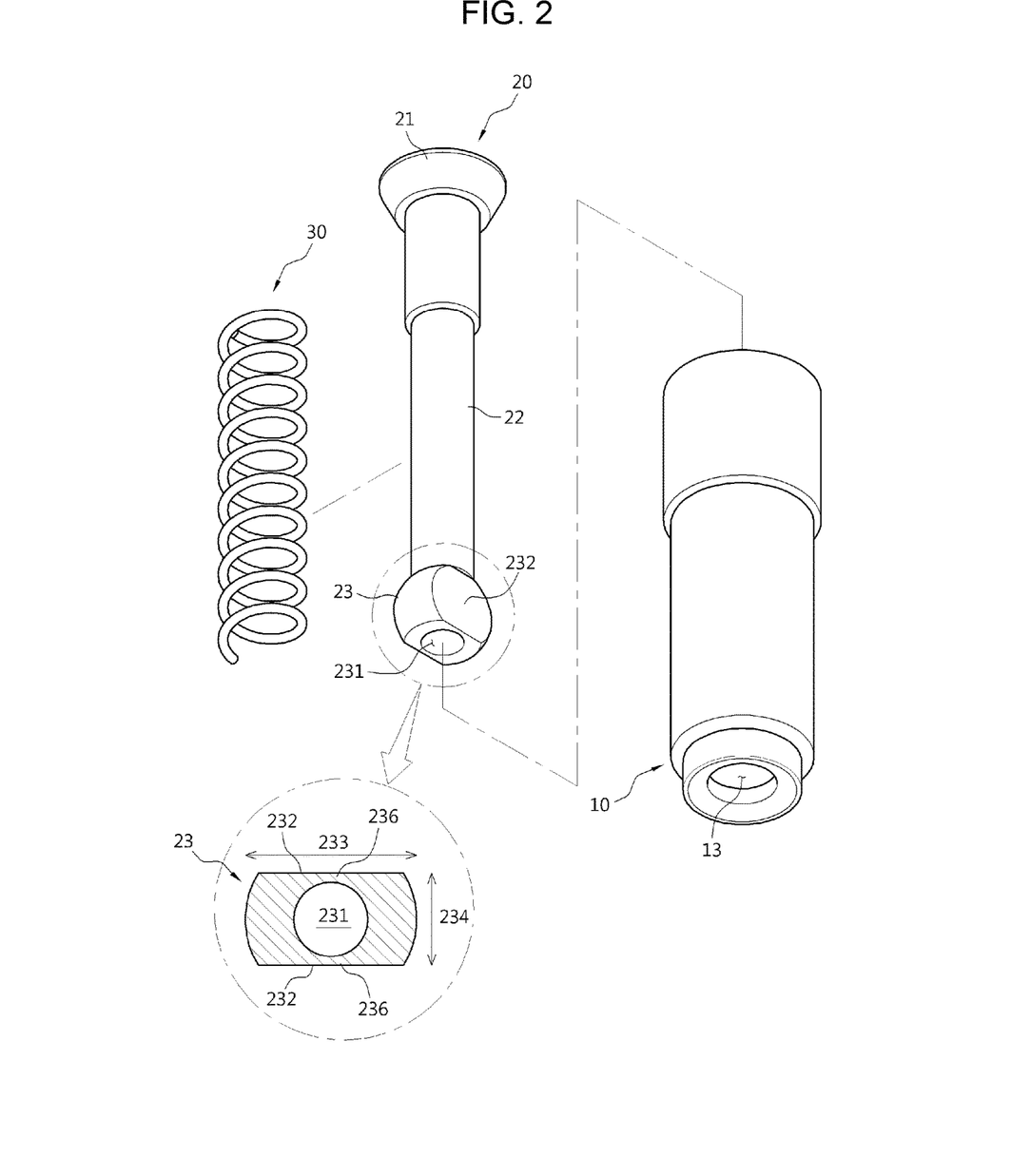
FIG. 2 is a separated perspective view of the spring vent for the tire vulcanizing mold according to the illustrated embodiment of the present invention.
Figure 3:
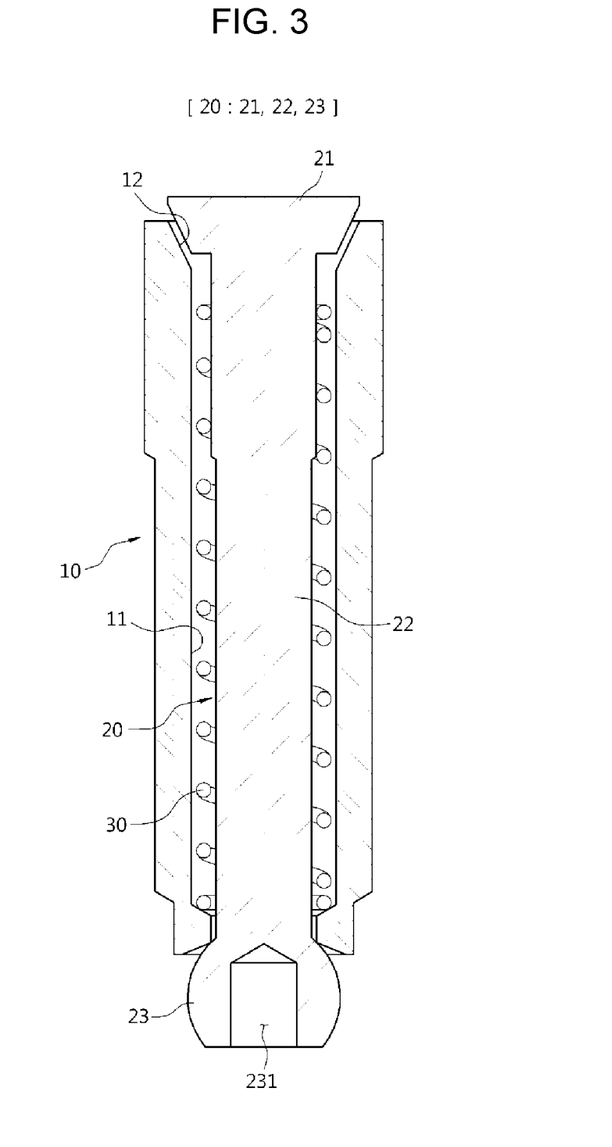
FIG. 3 is a longitudinal sectional view of the spring vent for the tire vulcanizing mold according to the illustrated embodiment of the present invention.

As illustrated in FIGS. 1 to 3, the sleeve 10 has a flow path 11 vertically passing through a central part therein while being formed to have a cylinder shape. An inlet 12 is formed at an upper end of the flow path 11 to communicate with an inside of the mold. An outlet 13 is formed at a lower end of the flow path 11 to communicate with an outside of the mold.

As illustrated in FIGS. 1 to 3, the rod 20 includes a head 21 for opening/closing the upper inlet 12 of the flow path, a bar-shaped body 22 formed at a lower part of the head 21 to be disposed along the flow path 11, and a stopper formed at a lower part of the body 22 while being disposed at the outlet 13 at the lower end of the flow path 11 to be hung at an outside of the outlet.

As illustrated in FIGS. 1 to 3, the stopper 23 is formed to have a spherical shape. An elastic hole 231 having an open bottom is formed in the stopper 23. Plane surfaces 232 are formed at opposite surfaces of the stopper such that the stopper 23 has a second face 233 and a first face 234. A length of the second face 233 of the stopper 23 is greater than a diameter of the outlet 13 of the sleeve 10. A length of the first face 234 of the stopper 23 is smaller than a diameter of the outlet 13 (see FIG. 2 and [A] of FIG. 5).

Figure 5:
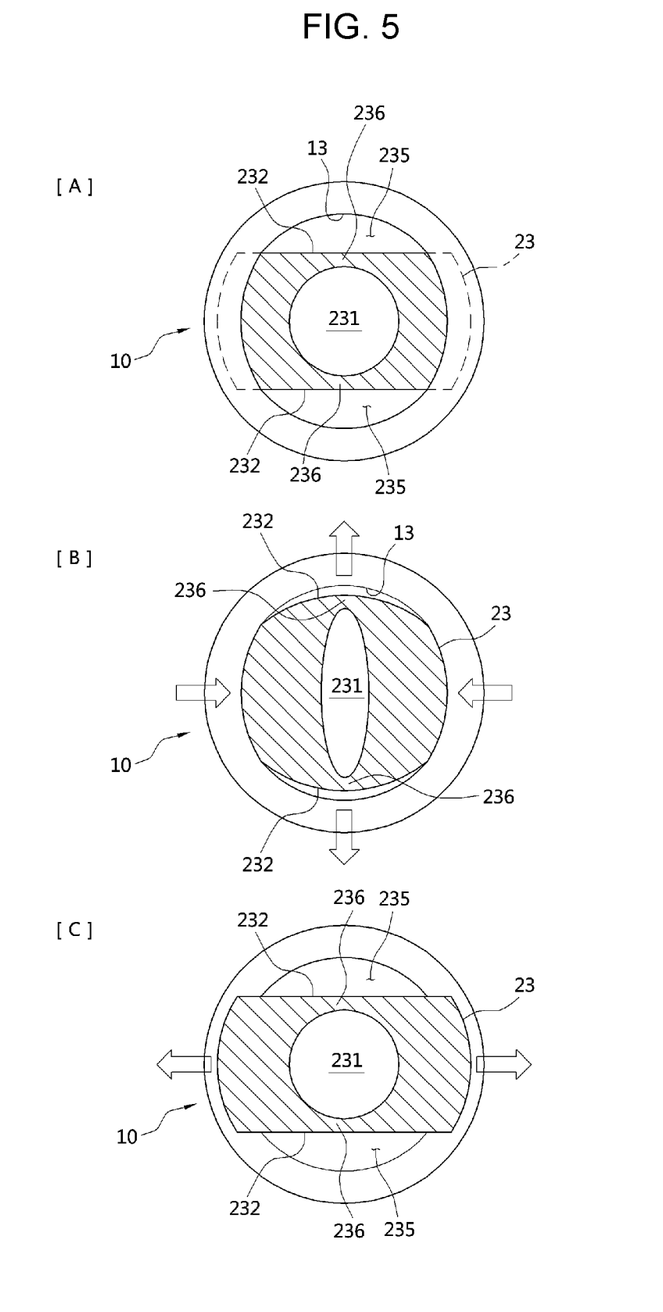
FIG. 5 is latitudinal sectional views illustrating the coupling process of the sleeve and rod according to the illustrated embodiment of the present invention.

Accordingly, due to the plane surfaces 232, niche spaces 235 are formed between an inner diameter surface of the outlet 13 of the sleeve 10 and the plane surfaces 232 of the stopper 23, respectively (see [A] of FIG. 5). Namely, each niche space 235 is formed at each plane surface 232 of the stopper 23.

Hereinafter, according to the illustrated embodiment of the present invention, an air exhaust process employing the above described configuration will be explained.

As illustrated in FIGS. 3 and 5, when pressure is applied in the vulcanizing mold, air in the vulcanizing mold and green tire is introduced into the flow path 11 through the inlet 12 of the sleeve 10 (see FIG. 3). Air moving along the flow path 11 is exhausted through the niche space 235 to the outside (see [A] of FIG. 5)

When pressure is continuously applied in the mold, the green tire and the head 21 of the rod 20 contact with each other, the head 21 of the rod 20 goes down and, as such, the head 21 closes the upper inlet 12 at the upper end of the flow path 11.

Meanwhile, according to the conventional mini vent, for replacement of a valve structure disposed at a vent hole of a casing, engagement parts protruding from an inner diameter surface of the casing are damaged using a tool, so that a stopper of the valve structure passes through the vent hole. Then the valve structure is lifted upwards to be separated from the casing. However, when the engagement parts are damaged using the tool, the casing and valve structure are damaged and are not restored to the original shape thereof, and, as such, not only the valve structure but also the entire mini vent should be replaced.

Furthermore, to couple the casing and valve structure, the stopper of the valve structure is inserted through an inlet at an upper end of the vent hole of the casing, and the stopper passes through the vent hole to be disposed at an lower end of the vent hole, namely, at an outside of the casing. Sequentially, the engagement parts are formed at the lower end of the casing using a tool. This serves to prevent separation of the valve structure from the vent hole.

Thus, according to the conventional configuration, it is inconvenient to replace only the valve structure in the casing, and, as such, maintenance costs are increased and work efficiency is decreased.

Hereinafter, a coupling and replacement process of the sleeve 10 and rod 20 according to the illustrated embodiment of the present invention will be described.

Figure 4:
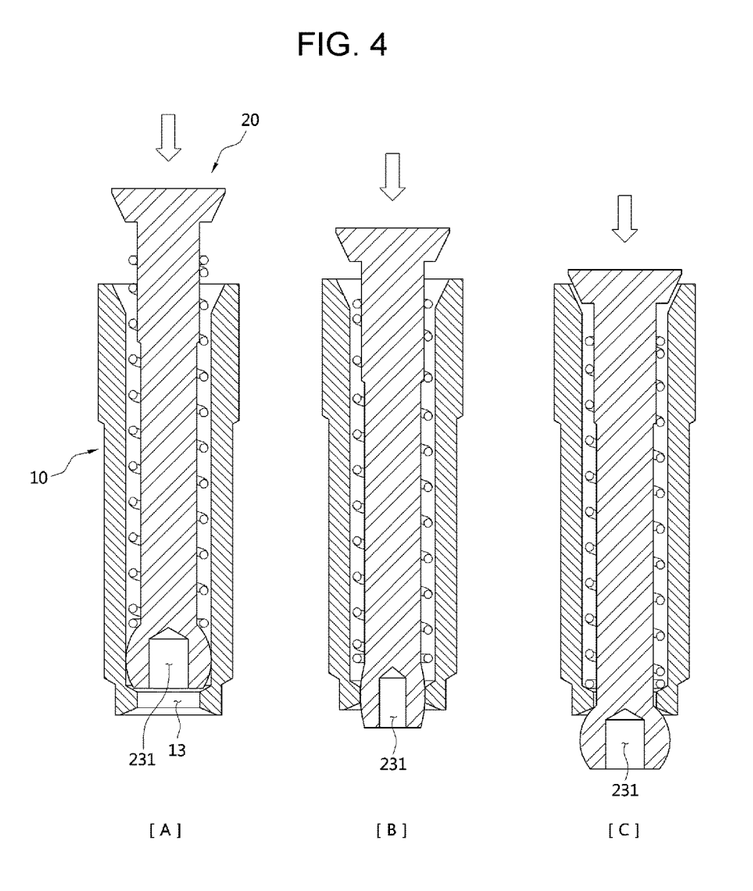
FIG. 4 is longitudinal sectional views illustrating a coupling process of a sleeve and rod according to the illustrated embodiment of the present invention.

As illustrated in FIGS. 4 and 5, to couple the rod 20 to the flow path 11 of the sleeve 10, first, the stopper 23 of the rod 20 is introduced through the upper inlet 12 of the sleeve 10. Then, as the stopper 23 passes through the flow path 11 of the sleeve 10, the stopper 23 is disposed to go down to the lower end of the flow path 11, namely, the outlet 13. As illustrated in [A] of FIG. 4 and [A] of FIG. 5, since the length of the second face 233 of the stopper 23 is greater that the diameter of the outlet 13 and the length of the first face 234 of the stopper 23 is smaller than the diameter of the outlet 13, the stopper 23 is hung at the lower end of the flow path 11, namely, the upper end of the outlet 13.

According to the illustrated embodiment of the present invention, since the stopper 23 is entirely formed to have a spherical shape, the surface of the stopper 23 is curved. Furthermore, the stopper 23 is formed to have the elastic hole 231 having the open bottom and the plane surfaces 232 disposed at the opposite surfaces. Accordingly, due to the elastic hole 231 and the plane surfaces 232, as seen in a cross-sectional view of the stopper 23, elastic parts 236 are formed between the elastic hole 231 and the plane surfaces 232, respectively, while each elastic part 236 includes a thin cross section (see FIGS. 2 and 5).

Here, as illustrated in [A] of FIG. 4 and [A] of FIG. 5, when pressure is applied to the head 21 of the rod 20 using a tool, due to the surface of the spherical-shaped stopper 23, the stopper 23 goes down along the inner diameter surface of the outlet 13 of the sleeve. In this case, the second face 233 of the stopper 23 is pressurized along the inner diameter surface in the inward direction of the stopper 23, while each elastic part 236 is deformed in the outward direction of the stopper 23 by elastic force, thereby deforming the elastic hole 231. That is, the stopper 23 is deformed corresponding to a shape of the outlet 13 and, as such, the stopper 23 passes through the outlet 13 to be disposed at the outside of the sleeve 10.

As illustrated in [C] of FIG. 4 and [C] of FIG. 5, when the stopper 23 of the rod 20 passes through the outlet 13 of the sleeve 10 to be exposed at the outside of the sleeve 10, the stopper 23 is restored to the original shape thereof by elastic force.

Figure 6:
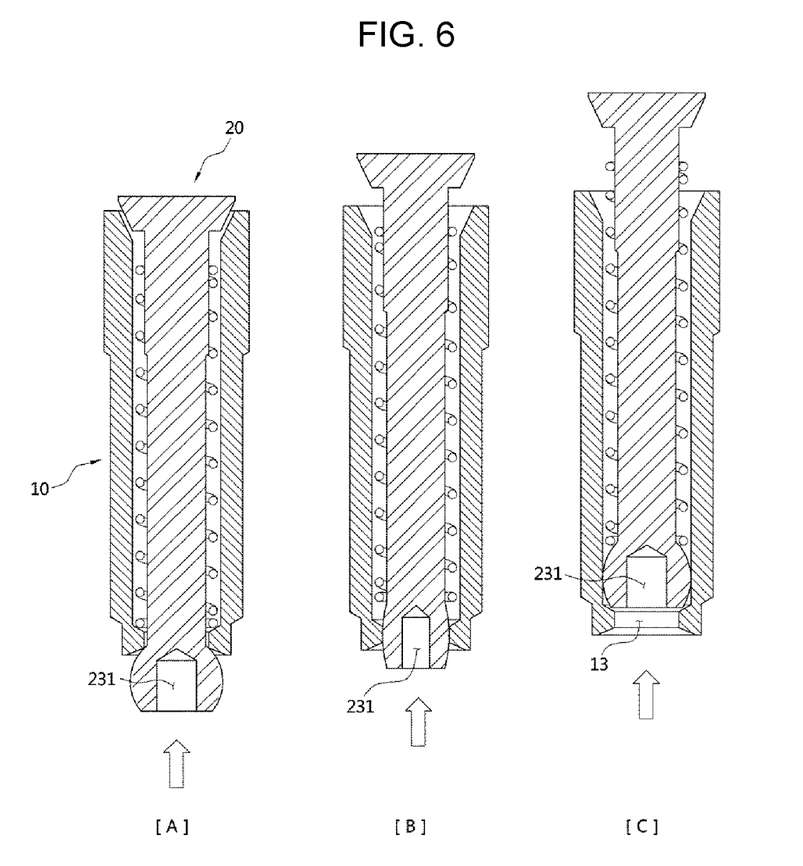
FIG. 6 is longitudinal views illustrating a separating process of the sleeve and rod according to the illustrated embodiment of the present invention.

Meanwhile, as illustrated in [A] of FIG. 6, to replace the rod 20 at the sleeve 10, first, pressure is applied to a lower end of the stopper 23 disposed at the outside of the lower outlet 13 of the sleeve 10 using a tool.

As illustrated in [A] of FIG. 6, due to the surface of the spherical-shaped stopper 23, the stopper 23 is lifted along the inner diameter surface of the outlet 13 of the sleeve 10. The second face 233 of the stopper 23 is pressurized by the outlet 13 in the inward direction of the stopper 23, while each elastic part 236 is deformed in the outward direction of the stopper 23 by elastic force, thereby deforming the elastic hole 231. Namely, as the stopper 23 is deformed corresponding to the shape of the outlet 23, the stopper 23 passes through the outlet 13 to be introduced into the flow path 11.

In addition, as illustrated in [C] of FIG. 6, when the stopper 23 of the rod 20 passes through the outlet 13 of the sleeve 10 to be introduced into the flow path 11, the stopper 23 is restored to the original shape thereof by elastic force. Accordingly, the rod 20 may be easily separated to the outside of the sleeve 10 through the inlet 12 of the sleeve 10.

Finally, when the rod 20 is replaced, the stopper 23 is elastically deformed due to the spherical-shaped stopper 23, the elastic hole 231 formed at the stopper 23, the plane surfaces 232 formed at the opposite surfaces of the stopper 23, and the elastic parts 236 formed between the elastic hole 231 and the plane surfaces 232, respectively.

Accordingly, since it is easy to replace the rod 20 at the sleeve 10, work efficiency of a user is increased. Furthermore, in a replacement process of the rod 20, damage to the sleeve 10 is prevented and only the rod 20 is replaced, and, as such, maintenance costs are decreased. Hereinafter, a method of manufacturing the rod according to the illustrated embodiment of the present invention will be described.

As illustrated in FIGS. 7 to 11, according to the illustrated embodiment of the present invention, the method of manufacturing the rod 20 mainly includes a mounting process S10, a shaping process S20 and a cutting process S30.

Figure 7:
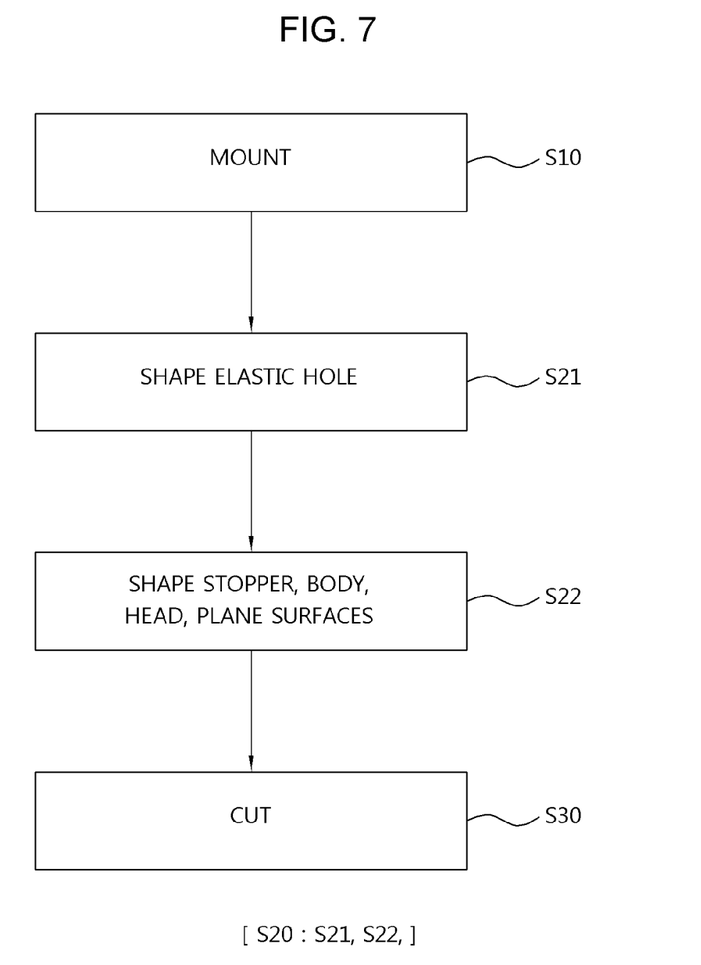
FIG. 7 is a flowchart illustrating a method of manufacturing the rod according to the illustrated embodiment of the present invention.
Figure 8:
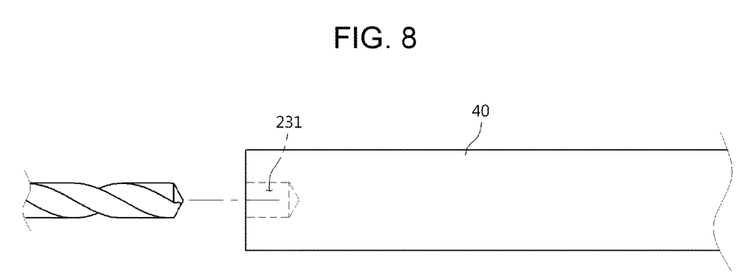
FIGS. 8 to 11 are lateral views illustrating a method of manufacturing the rod according to the illustrated embodiment of the present invention.
Figure 9:
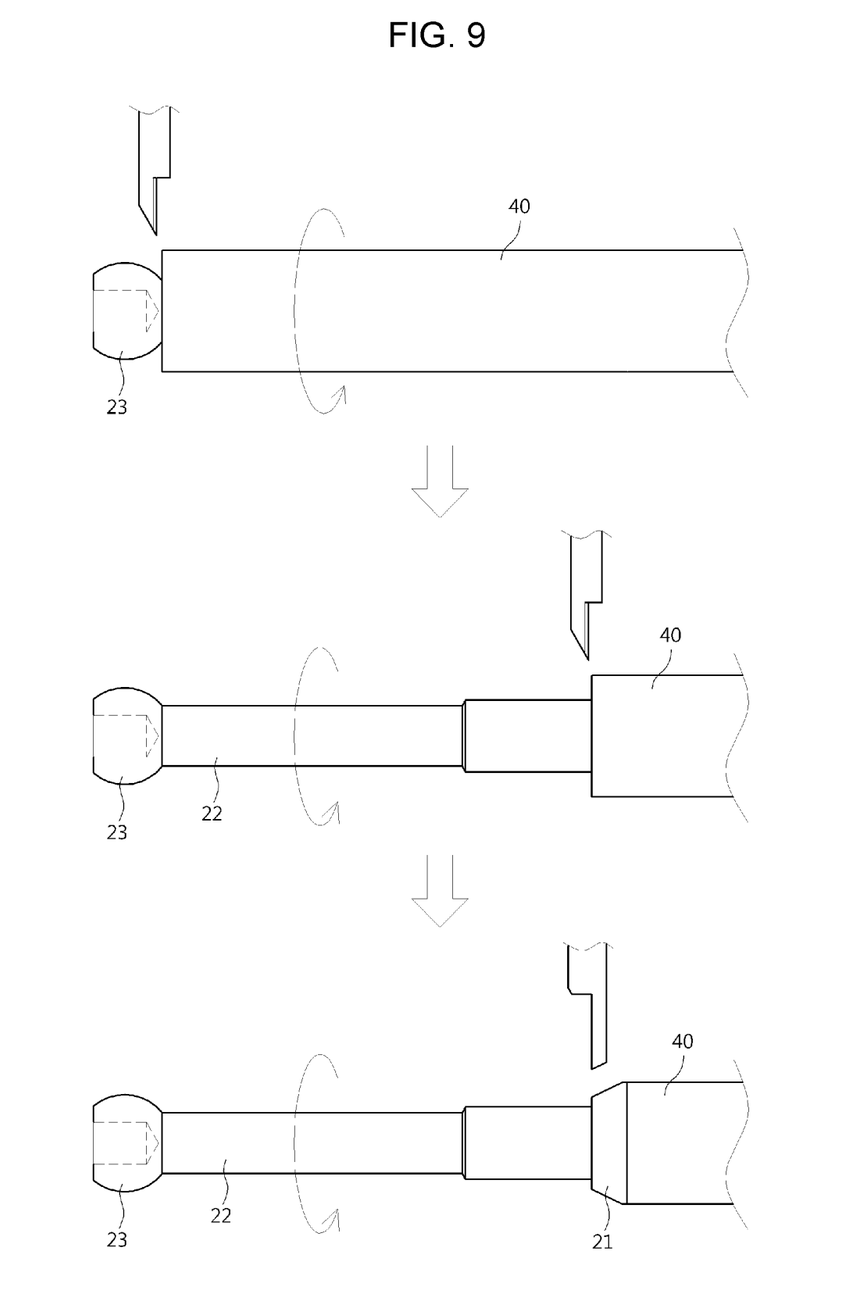
Figure 10:
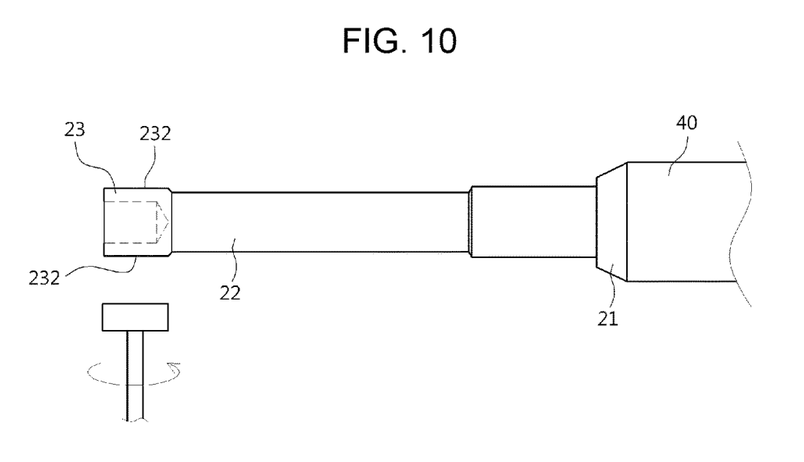
Figure 11:
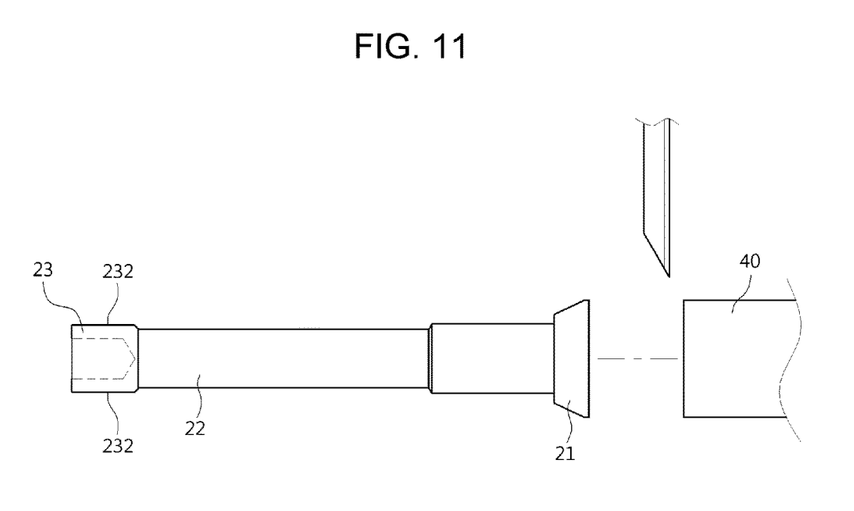

In detail, as illustrated in FIGS. 7 and 8, the mounting process S10 is a preparation for the shaping process, in which a round bar 40 made of a metal material which is the basis of the rod 20 is mounted on a lathe.

The shaping process S20 includes a shaping process S21 of the elastic hole 231 and a shaping process S22 of the stopper 23, the body 22, the head 21, and the plane surfaces 232.

As illustrated in FIGS. 7 and 8, the shaping process S21 is a formation process of the elastic hole 231 at a central part of an end of the round bar 40 using a drill.

As illustrated in FIGS. 7 and 8, the shaping process 22 is a formation process of the stopper 23, the body 22, the head 21, and the plane surfaces 232, in which, while the round bar 40 having the elastic hole 231 is rotated on the lathe, the stopper 23, the body 22, the head 21, and the plane surfaces 232 are sequentially formed using a bite. In this case, the stopper 23 is shaped to have a spherical shape. A diameter of the stopper 23 is smaller than the diameter of the flow path 11 of the sleeve 10 and greater than the diameter of the outlet 13 of the sleeve 10. Accordingly, the elastic hole 231 is formed in the stopper 23 and is formed to have an open bottom. In addition, the plane surfaces 232 are formed at opposite surfaces of the stopper 23, respectively.

The cutting process S30 is a cutting process of the head 21 of the rod 20 including the stopper 23, the body 22, the head 21 and the plane surfaces 232 from the round bar 40. In a conventional mini vent, after shaping the valve structure and casing and coupling the valve structure to the casing, a plurality of engagement parts is formed at the lower part of the casing using a tool in order to prevent the valve structure from being separated from the casing. Whereas, in the illustrated embodiment of the present invention, after shaping the rod 20, the rod 20 is inserted into the sleeve 10 to be coupled with the sleeve 10. Upon replacement of the rod 20, the sleeve 10 is not reprocessed but the rod 20 is reprocessed to be coupled, such that it is easy to manufacture the spring vent. Furthermore, in the conventional mini vent, for replacement of the valve structure, the engagement parts protruding from the inner diameter of the casing are damaged using a tool such that the stopper of the valve structure passes through the vent hole of the casing, and then the valve structure is lifted upwards to separate the valve structure from the casing. However, when the engagement parts are damaged, the casing and the valve structure are damaged and are not restored to the original shape thereof, and, as such, the entire mini vent is replaced.

According to the conventional configuration, since it is inconvenient to replace the valve structure, maintenance costs are increased and work efficiency is decreased. Furthermore, it is inconvenient to manufacture the casing. However, in the illustrated embodiment of the present invention, it is easy to couple and separate the sleeve 10 and the rod 20. In terms of replacement of the rod 20, the sleeve 10 is not damaged and, as such, maintenance costs are decreased and work efficiency is increased.

Figure 12:
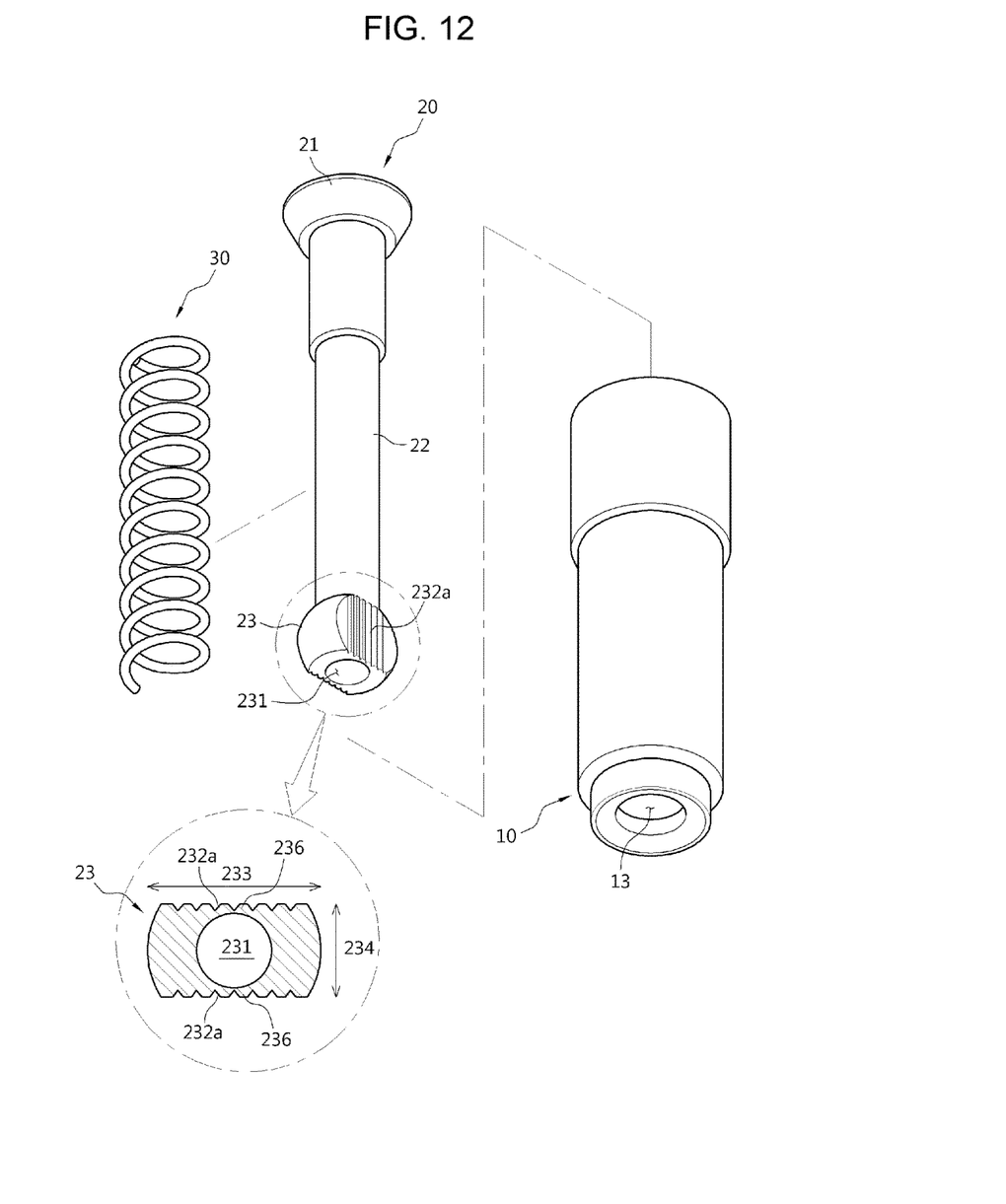
FIGS. 12 to 15 are views illustrating a stopper according to another embodiment of the present invention.
Figure 13:
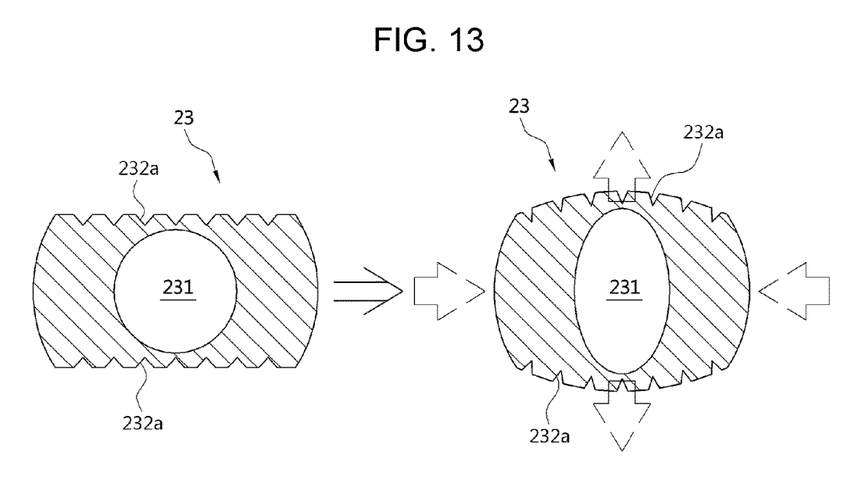

Meanwhile, as illustrated in FIGS. 12 and 13, the plane surfaces 232 are formed at opposite surfaces of the stopper 23, respectively. In this case, a plurality of elastic grooves 232a may be formed at each plane surface 232 as the stopper 23 passes through the outlet 13 of the flow path 11 to elastically contract and expand. As a result, the stopper 23 may be easily deformed due to the elastic holes 232a.

Figure 14:
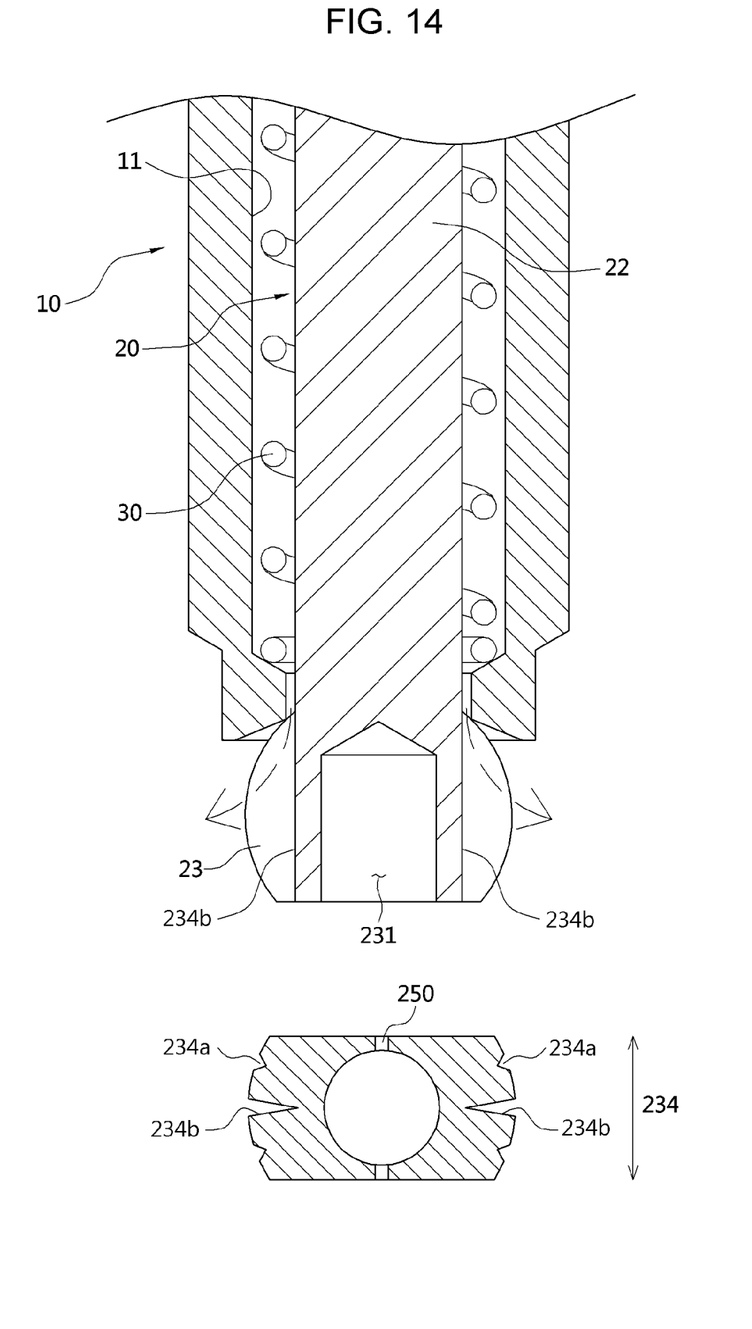
Figure 15:
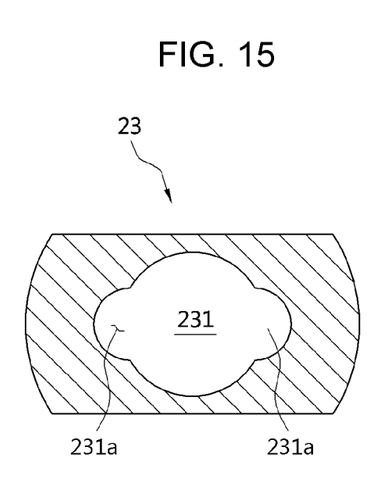

As illustrated in FIG. 13, the elastic grooves 232a or a boundary groove 250 may be formed at the first face 24 of the stopper 23. Thus, the stopper 23 may easily contract or expand due to the elastic grooves 232a and the boundary groove 250. As illustrated in FIG. 14, an elastic recessed groove 234a and an air vent groove 234b may be further formed at the surface of the second face 233 of the stopper 23. Accordingly, when being exhausted, air may be rapidly exhausted through the air vent groove 234b as well as the niche spaces 235. As illustrated in FIG. 15, to easily deform the stopper 23, auxiliary holes 231a may be further formed at opposite surfaces of the elastic hole 231 of the stopper 23. Accordingly, the stopper 23 is elastically deformed, namely, contracts and expands well, and, as such, the stopper 23 may easily pass through the outlet 13.

As is apparent from the above description, in accordance with the present invention, the spring vent for the tire vulcanizing mold is provided. Due to structural improvement of the spring vent, it is easy to replace the rod at the sleeve. As a result, maintenance costs are decreased and work efficiency is increased.

Although the present invention has been described using limited embodiments of "a spring vent for a tire vulcanizing mold" having specific shape and structure and drawings, it should be understood that many variations and modifications of the basic concept described herein will still fall within the scope of the present invention as defined in the appended claims.

What is claimed is:

1. A spring vent for a tire vulcanizing mold comprising:
   a sleeve having a flow path vertically passing therethrough;
   a head opening/closing an inlet at an upper end of the flow path;
   a rod comprising a bar body formed below the head and disposed along the flow path and a stopper formed below the bar body to be hung to an outside of an outlet at a lower end of the flow path; and
   a spring inserted into the bar body, wherein:
   the stopper of the rod is formed to have a spherical shape;
   an elastic hole having an open bottom is formed in the stopper;
   plane surfaces are formed at opposite surfaces of the stopper and a first face and a second face are formed at the stopper;
   a length of the second face of the stopper is greater than a diameter of the outlet, a length of the first face of the stopper is smaller than the diameter of the outlet, and the stopper is elastically deformable to deform when the stopper passes through the outlet of the flow path and restore to an original shape thereof after passing through the outlet; and
   a plurality of elastic grooves is formed at each plane surface when the stopper passes through the outlet of the flow path to elastically contract and expand.

2. The spring vent according to claim 1, wherein the second face of the stopper includes an air vent groove formed at a surface thereof.

3. The spring vent according to claim 1, wherein the elastic hole of the stopper includes auxiliary grooves at opposite surfaces thereof, to be deformed.

4. A spring vent for a tire vulcanizing mold comprising:
   a sleeve having a flow path vertically passing therethrough;
   a head opening/closing an inlet at an upper end of the flow path;
   a rod comprising a bar body formed below the head and disposed along the flow path and a stopper formed below the bar body to be hung to an outside of an outlet at a lower end of the flow path; and
   a spring inserted into the bar body, wherein:
   the stopper of the rod is formed to have a spherical shape;
   an elastic hole having an open bottom is formed in the stopper;
   plane surfaces are formed at opposite surfaces of the stopper and a first face and a second face are formed at the stopper;
   a length of the second face of the stopper is greater than a diameter of the outlet, a length of the first face of the stopper is smaller than the diameter of the outlet, and the stopper is elastically deformable to deform when the stopper passes through the outlet of the flow path and restore to an original shape thereof after passing through the outlet; and
   the first face of the stopper includes an elastic groove or a boundary groove at a surface thereof.

5. A spring vent for a tire vulcanizing mold comprising:
   a sleeve having a flow path vertically passing therethrough;
   a head opening/closing an inlet at an upper end of the flow path;
   a rod comprising a bar body formed below the head and disposed along the flow path and a stopper formed below the bar body to be hung to an outside of an outlet at a lower end of the flow path; and
   a spring inserted into the bar body, wherein:
   the stopper of the rod is formed to have a spherical shape;
   an elastic hole having an open bottom is formed in the stopper;
   plane surfaces are formed at opposite surfaces of the stopper and a first face and a second face are formed at the stopper;
   a length of the second face of the stopper is greater than a diameter of the outlet, a length of the first face of the stopper is smaller than the diameter of the outlet, and the stopper is elastically deformable to deform when the stopper passes through the outlet of the flow path and restore to an original shape thereof after passing through the outlet; and
   the second face of the stopper includes an air vent groove formed at a surface thereof.

* * * * *